(12) United States Patent
Mahurkar et al.

(10) Patent No.: US 10,834,594 B1
(45) Date of Patent: Nov. 10, 2020

(54) SYSTEMS AND METHODS FOR AUTHENTICATION SHARING

(71) Applicant: Verizon Patent and Licensing Inc., Arlington, VA (US)

(72) Inventors: Sagar Mahurkar, Frisco, TX (US); Anjaneya Pericharla, Irving, TX (US); Sanjay Ahuja, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/654,475

(22) Filed: Oct. 16, 2019

(51) Int. Cl.
*H04M 3/42* (2006.01)
*H04W 12/06* (2009.01)
*H04W 12/00* (2009.01)
*H04W 76/14* (2018.01)
*H04W 12/08* (2009.01)
*H04W 4/80* (2018.01)

(52) U.S. Cl.
CPC ......... *H04W 12/0609* (2019.01); *H04W 4/80* (2018.02); *H04W 12/003* (2019.01); *H04W 12/0017* (2019.01); *H04W 12/0051* (2019.01); *H04W 12/08* (2013.01); *H04W 76/14* (2018.02)

(58) Field of Classification Search
CPC ......... H04W 12/0609; H04W 12/0051; H04W 12/08; H04W 12/003; H04W 76/14; H04W 4/80; H04W 12/0017

USPC ....................................................... 455/414.1
See application file for complete search history.

(56) References Cited

U.S. PATENT DOCUMENTS

| | | | |
|---|---|---|---|
| 9,531,578 B2 * | 12/2016 | Gilson | H04L 67/16 |
| 10,366,214 B2 * | 7/2019 | Li | G06F 21/30 |
| 2017/0148018 A1 * | 5/2017 | Levin | G06Q 20/3829 |

* cited by examiner

*Primary Examiner* — Amancio Gonzalez

(57) ABSTRACT

A first device may discover, using a short-range wireless communication protocol, an authentication service advertised by a second device, and may establish, with the second device, a connection using the short-range wireless communication protocol. The first device may display, after establishing the connection with the second device, a first identifier, and may provide to the second device a confirmation request including the first identifier to permit the second device to determine whether a second identifier, input by a user into the second device, matches the first identifier. The first device may receive, from the second device, encrypted credentials to authenticate the user to access a service based on the second device determining whether the second identifier matches the first identifier. The first device may decrypt the encrypted credentials to obtain credentials, and may authenticate, using the credentials, the user to access the service.

20 Claims, 8 Drawing Sheets

SYSTEMS AND METHODS FOR AUTHENTICATION SHARING

BACKGROUND

Over the top (OTT) media service is a streaming media service offered to viewers over the Internet. OTT media service is typically subscription-based and may be accessed via websites on personal computers, applications on mobile devices, digital media players, and/or smart televisions (TVs).

DETAILED DESCRIPTION OF PREFERRED EMBODIMENTS

Figure 1A:
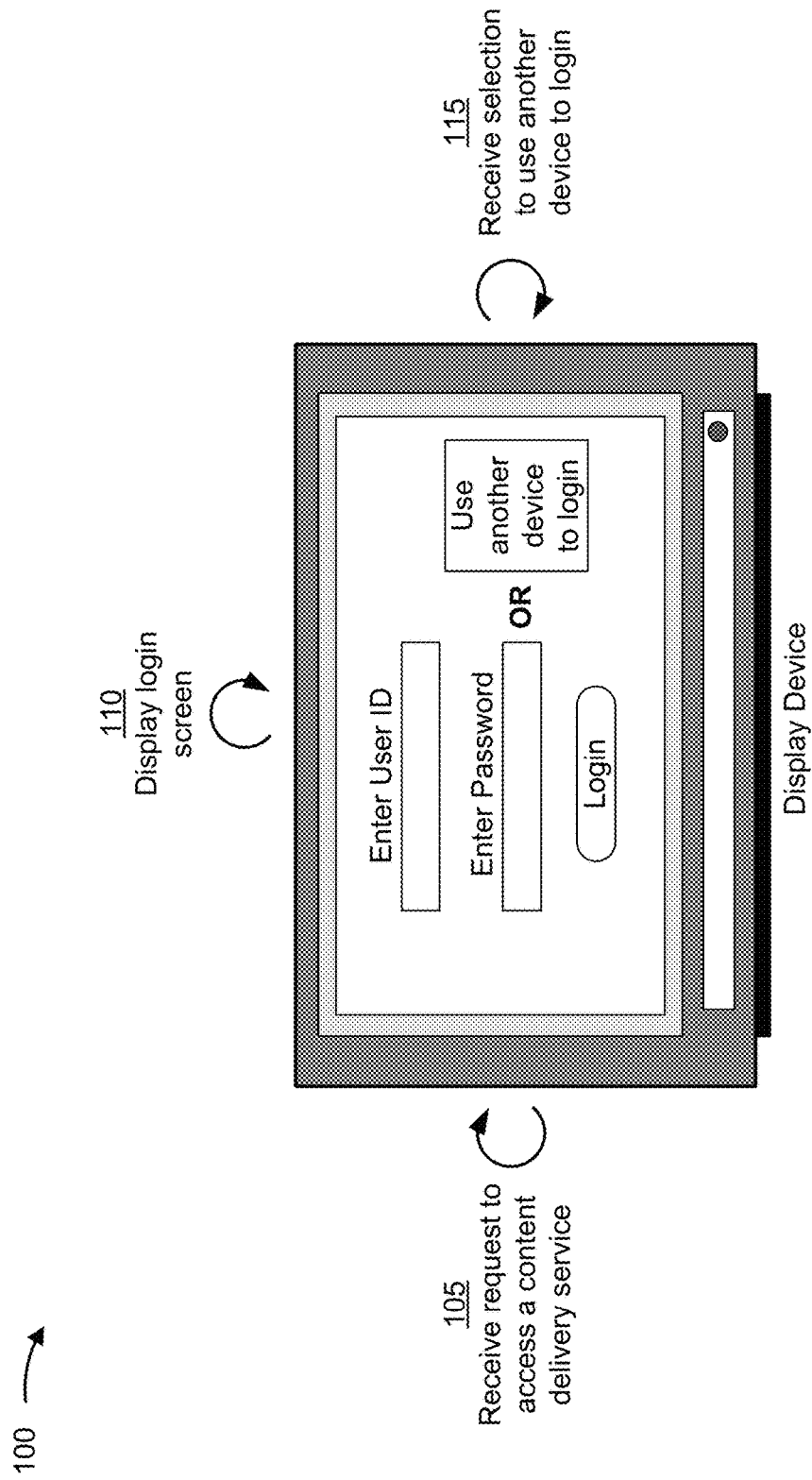
FIGS. 1A-1E are diagrams of one or more example implementations described herein.

The following detailed description of example implementations refers to the accompanying drawings. The same reference numbers in different drawings may identify the same or similar elements.

To access a video service (e.g., an OTT media service and/or the like), a streaming device (e.g., a set-top box, a casting stick, a portable electronic device running a streaming application, a television running a streaming application, and/or the like) may prompt a user to enter credentials (e.g., a username and/or password and/or the like) to authenticate the user to access the video service. The user may not remember the credentials, and may request to reset their credentials (e.g., reset their username and/or password). Receiving the request to reset the credentials of the user, processing the request according to a credential reset procedure, and instructing the user through the credential reset procedure consume computing resources (e.g., processing resources, memory resources, power resources, communication resources, and/or the like) and consume network resources by increasing network traffic flow between the streaming device and one or more computer systems handling the credential reset procedure. Additionally, or alternatively, the user may become frustrated with themselves (and indirectly frustrated with the service) because the user cannot remember the credentials, may become frustrated by the credential reset procedure, and may become frustrated that a new password must be entered into all devices using the video service. Furthermore, the user wastes time and computing resources inputting the credentials, and, if the user is trying to enter the credentials using a television remote, the user interface may be frustrating to the user.

As an alternative, the streaming device may prompt the user to share the credentials from another device already storing the credentials. For example, the user may share the credentials stored on a mobile device with the streaming device over an internet connection. However, transmitting the credentials from the mobile device over the Internet to the streaming device consumes network resources and exposes the credentials to illicit interception. Furthermore, even if a secure cloud-based credential-sharing system were established to deter illicit activity, transmitting the credentials from the mobile device to the cloud-based credential-sharing system, processing the received credentials within the cloud-based credential-sharing system (e.g., to encrypt the credentials, to identify a recipient streaming device, to authenticate the mobile device and the streaming device, and/or the like), and transmitting the credentials from the cloud-based credential-sharing system to the streaming device would consume computing resources (e.g., processing resources, memory resources, power resources, communication resources, and/or the like) and/or network resources. Additionally, or alternatively, sharing credentials over an internet connection and/or via a cloud-based credential-sharing system may be slow due to network traffic.

Some implementations described herein provide a method for sharing, with a first device (e.g., a display device, a set-top box, a casting stick, a portable electronic device running a streaming application, a television running a streaming application, and/or the like), credentials stored on a second device (e.g., a user device, another set-top box, another casting stick, another portable electronic device running the streaming application, another television running the streaming application, and/or the like) using a short-range wireless communication protocol. In some implementations, the first device may discover, using the short-range wireless communication protocol, an authentication service advertised by the second device and may establish a connection with the second device using the short-range wireless communication protocol. After establishing the connection with the second device (e.g., based on establishing the connection with the second device, once the connection with second device is established, and/or the like), the first device may display a first identifier, and may provide, to the second device via the connection, a confirmation request including the first identifier to permit the second device to determine whether a second identifier, input by a user into the second device, matches the first identifier.

In some implementations, the first device may receive, from the second device and via the connection, encrypted credentials to authenticate the user to access a service based on the second device determining whether the second identifier matches the first identifier. The first device may decrypt (e.g., using a stored key and/or the like) the encrypted credentials to obtain credentials, and may store the credentials in a memory of the first device. In some implementations, the first device may authenticate, using the credentials, the user to access the service.

In this way, the first device may conserve computing resources (e.g., processing resources, memory resources, power resources, communication resources, and/or the like) and/or network resources by avoiding requests to reset credentials and the use of computer systems for handling the credential reset procedure. Additionally, or alternatively, the first device may conserve computing resources (e.g., processing resources, memory resources, power resources, communication resources, and/or the like) and/or network resources that would otherwise be used by sharing credentials over the Internet and/or via a secure cloud-based credential-sharing system. In some implementations, by using a short-range wireless communication protocol to share encrypted credentials, the first device may reduce the likelihood that the credentials will be impermissibly intercepted and may prevent network traffic from slowing the sharing process.

Additionally, or alternatively, by sharing the credentials stored on the second device with the first device, the user may not need to remember the credentials, become frustrated with themselves (and indirectly frustrated with the service) because the user cannot remember the credentials, become frustrated by the credential reset procedure, or become frustrated that a new password must be entered into all devices using the service. Furthermore, by sharing the credentials stored on the second device with the first device, the user may not waste time and computing resources inputting the credentials or become frustrated by the user interface used to enter the credentials.

FIGS. 1A-1E are diagrams of one or more example implementations 100 described herein. For example, as shown in FIGS. 1A-1E, example implementation(s) 100 may include a display device and a user device.

As shown in FIG. 1A, and by reference number 105, the display device may receive a request to access a content delivery service. In some implementations, the display device may display a list of content delivery services (e.g., a menu, a row of icons for content delivery services, a grid of icons for content delivery services, and/or the like) for selection by a user, and the display device may receive a selection of a content delivery service from the list. For example, the display device may receive, from a remote control, the selection of an icon representative of the content delivery service.

As shown in FIG. 1A, and by reference number 110, the display device may display a login screen for the selected content delivery service. For example, the display device may display the login screen based on receiving the request to access the content delivery service. In some implementations, the display device may display a login screen that includes input fields and prompts for the user to enter credentials (e.g., a user ID, a password, and/or the like) to authenticate the user to access the content delivery service. For example, the display device may receive user input of the credentials and use the credentials to log into and access the content delivery service.

In some implementations, the display device may display a login screen that includes a user interface (e.g., a virtual button and/or the like) prompting the user to use another device to login to the content delivery service. As shown in FIG. 1A, and by reference number 115, the display device may receive a selection to use another device to login. For example, the display device may receive the selection to use another device to login while displaying the login screen. In some implementations, the display device may receive the selection via an input button (e.g., a physical button on the display device, a physical button on a remote control associated with the display device, a virtual button on a touch-screen of the display device, and/or the like), a voice command (e.g., received via a microphone and/or the like), and/or the like.

Figure 1B:
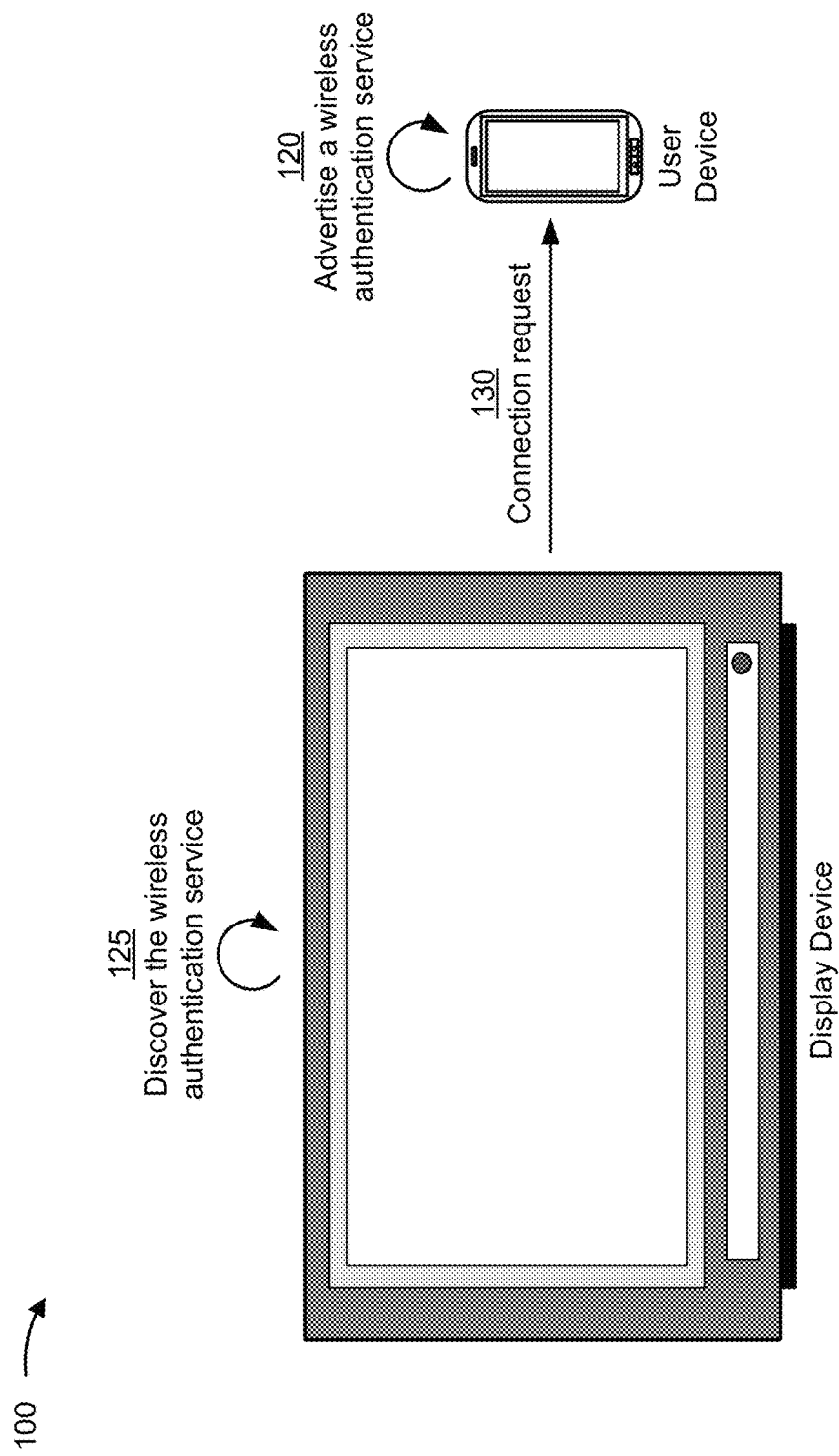

As shown in FIG. 1B, and by reference number 120, the user device may advertise a wireless authentication service. In some implementations, the user device may receive user input and, based on the user input, advertise the wireless authentication service. For example, the user device may receive user input to open an application (e.g., an application for accessing the content delivery service, an application associated with the content delivery service, and/or the like) and open the application. After opening the application, the user device may receive user selection of an option within the application to share credentials with another device. For example, the user device may receive user input selecting to log into the content delivery service on another device, and the user device may, based on the user selection, advertise the wireless authentication service.

In some implementations, the user device may advertise the wireless authentication service using a short-range wireless communication protocol (e.g., Wi-Fi, Bluetooth, Bluetooth Low Energy (BLE), near-field communication (NFC), and/or the like). In some implementations, the user device may use a short-range wireless communication protocol which uses signals that travel from a few centimeters to several meters, such as ten or twenty meters and typically less than one hundred meters.

In some implementations, the user device may advertise the wireless authentication service using BLE. For example, the user device may advertise with a predefined service identifier with a predefined characteristic identifier. By using the predefined service identifier, the user device allows other devices attempting to discover the wireless authentication service to quickly identify a service that the user device can provide to the other devices and determine whether to connect with the user device. By using the predefined characteristic identifier, the user device further confirms to other devices attempting to discover the wireless authentication service that the user device is advertising the wireless authentication service. In other words, the predefined service identifier and the predefined characteristic identifier distinguish the wireless authentication service being advertised by the user device from other simultaneously advertised BLE services.

In some implementations, the user device may include a device-type filter when advertising the wireless authentication service using BLE to prevent Bluetooth-enabled devices that are incapable of accessing the content delivery service (e.g., stylus pens, remote controls, and/or the like) from connecting to the user device via the wireless authentication service. For example, the user device may include a device-type filter that prevents Bluetooth-enabled remote controls from connecting to the user device. If a remote control discovers the wireless authentication service and sends a request for connection to the user device, the device-type filter will deny the request for connection. The user device may include the device-type filter because the remote control is incapable of accessing the content delivery service and, if the remote control connects to the user device, the connection may prevent another device that is capable of accessing the content delivery service (e.g., the display device) from discovering the wireless authentication service and/or connecting to the user device. By using the device-type filter, the user device conserves computing resources (e.g., processing resources, memory resources, power resources, communication resources, and/or the like) that would be used to process connection requests and/or the like from devices that are incapable of accessing the content delivery service.

As shown in FIG. 1B, and by reference number 125, the display device may discover the wireless authentication service. For example, the display device may discover the wireless authentication service using a short-range wireless communication protocol (e.g., Wi-Fi, Bluetooth, BLE, NFC, and/or the like). In some implementations, the display device may, using BLE, discover the wireless authentication service based on the predefined service identifier.

In some implementations, the user device may advertise the wireless authentication service, and, when the user device and the display device come into proximity, the display device may discover the wireless authentication service. For example, the user may place the user device into sufficient proximity that the short-range wireless communication protocol may be utilized. Additionally, or alternatively, the display device, based on discovering the wireless authentication service, may display a screen requesting confirmation from the user to use the wireless authentication service. For example, the display device may not be displaying the login screen, and, after discovering the wireless authentication service (e.g., based on discovering the wireless authentication service), may display the login screen including the prompt to use another device to log into the content delivery service. Additionally, or alternatively, the display device may, based on receiving the selection to use another device to login (as shown in FIG. 1A and by reference number 115), discover the wireless authentication service.

As shown in FIG. 1B, and by reference number 130, the display device may provide, to the user device, a connection request. In some implementations, the display device may discover the wireless authentication service and then provide the connection request to the user device. Additionally, or alternatively, the display device may discover the wireless authentication service and determine whether the predefined service identifier and the predefined characteristic identifier of the advertised wireless authentication service match a stored predefined service identifier and a stored predefined characteristic identifier. For example, the display device may be running an application for accessing the content delivery service, and the application may include the stored predefined service identifier and the stored predefined characteristic identifier. Based on determining that the predefined service identifier and the predefined characteristic identifier of the advertised wireless authentication service match the stored predefined service identifier and the stored predefined characteristic identifier, the display device may provide, to the user device, the connection request.

In some implementations, the display device may provide the connection request to the user device using the short-range wireless communication protocol. For example, the display device may provide the connection request to the user device by subscribing to the predefined characteristic identifier on the predefined service identifier using BLE. In this way, the display device may establish a connection to the user device using the short-range wireless communication protocol.

By using a short-range wireless communication protocol, the display device may conserve computing resources (e.g., processing resources, memory resources, power resources, communication resources, and/or the like) and/or network resources that would otherwise be used by sharing credentials over the Internet and/or via a secure cloud-based credential-sharing system. Additionally, or alternatively, the display device may reduce the likelihood that the credentials will be impermissibly intercepted and may prevent network traffic from slowing the sharing process.

In some implementations, after establishing the connection and/or based on establishing the connection, the user device may stop advertising the wireless authentication service. For example, the user device may stop advertising the wireless authentication service once the connection is established. In some implementations, the user device may stop advertising the wireless authentication service on the predefined service identifier using BLE.

Additionally, or alternatively, after establishing the connection, the display device may stop discovering the wireless authentication service. For example, the display device may stop discovering the wireless authentication service once the connection is established.

In some implementations, after establishing the connection, if the connection fails, the display device may disconnect and reinitiate discovery of the wireless authentication service. For example, if the BLE connection fails, the display device may disconnect from the BLE services, and, after a time period (e.g., one second, two seconds, and/or the like), may reinitiate discovery using BLE.

It has been described that the user device advertises the wireless authentication service, the display device discovers the wireless authentication service being advertised by the user device, and the display device initiates a connection with the user device based on discovering the wireless authentication service. In some implementations, the display device may advertise the wireless authentication service, the user device may discover the wireless authentication service being advertised by the display device, and the user device may initiate a connection with the display device based on discovering the wireless authentication service. For example, the display device may advertise the wireless authentication service based on receiving a selection to use another device to login (e.g., reference number 115 in FIG. 1A). An application executing on the user device may be used to discover the wireless authentication service being advertised by the display device. This application may initiate a connection with the display device based on discovering the wireless authentication service in a manner similar to that described above.

Figure 1C:
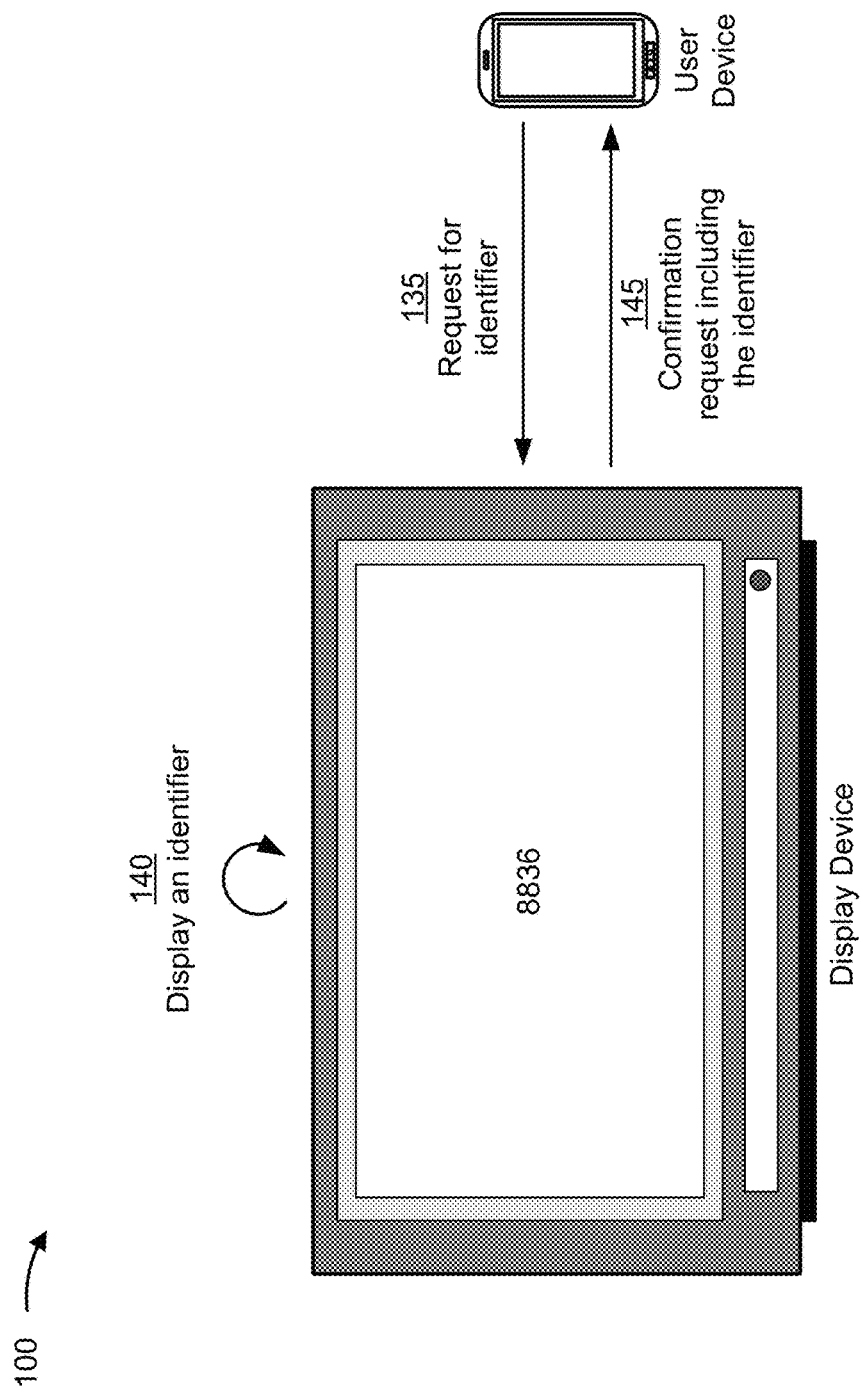

As shown in FIG. 1C, and by reference number 135, the user device may provide, to the display device, a request for an identifier. In some implementations, the user device may provide the request for the identifier via the connection to the display device. For example, the user device may provide the request for the identifier via the connection to the display device after establishing the connection, once the connection is established, based on establishing the connection, and/or the like. In some implementations, the user device may provide the request for the identifier by writing to the predefined characteristic identifier on the predefined service identifier using BLE.

In some implementations, the user device may prompt the user to authorize sharing of credentials. For example, the user device may, based on connecting to the display device, display a prompt with a virtual button requesting authorization to share credentials. In some implementations, the user device may display an authentication screen including information identifying the display device and/or the authentication service. In some implementations, the user device may receive user input authorizing the sharing of credentials. Additionally, or alternatively, the user device may provide, to the display device and based on receiving the user input authorizing the sharing of credentials, the request for the identifier.

As shown in FIG. 1C, and by reference number 140, the display device may display an identifier. In some implementations, the identifier may include a randomly-generated string of characters, a four-digit identification number, a randomly-selected word, a name assigned to the display device by the user for identification purposes within a home network, and/or the like. For example, and as shown in FIG. 1C, the display device may display "8836" as the identifier. In some implementations, the display device may display the identifier after receiving the request for the identifier. For example, the display device may display the identifier based on the request for the identifier.

As shown in FIG. 1C, and by reference number 145, the display device may provide, to the user device, a confirmation request including the identifier. In some implementations, the display device may provide the confirmation request via the connection to the user device. For example, the display device may provide the confirmation request by writing to the predefined characteristic identifier on the predefined service identifier using BLE. In some implementations, the display device may provide, to the user device, the confirmation request after receiving the request for the identifier, when the display device displays the identifier, based on the request for the identifier, and/or the like. In this way, the display device may request confirmation from the user device that the user intends to provide the wireless authentication service to the display device, rather than another device, and provide information (e.g., the identifier) to the user device that permits the user device to confirm the intent of the user.

Figure 1D:
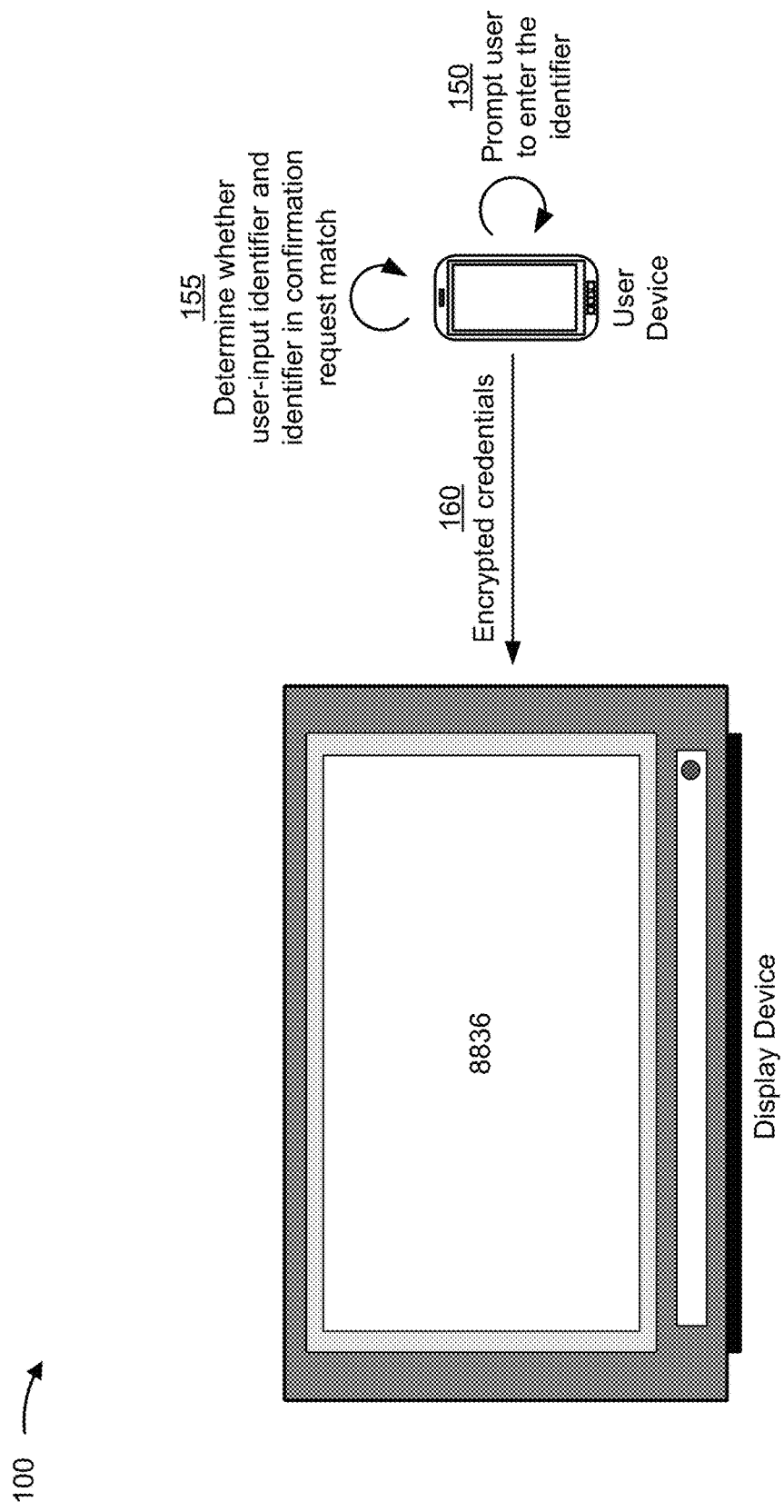

As shown in FIG. 1D, and by reference number 150, the user device may prompt the user to enter the identifier. For example, the user device may prompt the user to enter the identifier after receiving the confirmation request, based on receiving the confirmation request, after processing the confirmation request, and/or the like. In some implementations, the user device may prompt the user to enter the identifier by displaying an input field, displaying a user interface for inputting the identifier, and/or providing an instruction (e.g., displaying a text-based instruction, providing an audible instruction, and/or the like) to the user to enter the identifier. In some implementations, the user device may receive a user-input identifier provided by the user (e.g., via a keyboard, via a touch-based interface, via a remote control associated with the user device, via voice-based input, and/or the like).

As shown in FIG. 1D, and by reference number 155, the user device may determine whether the user-input identifier and the identifier in the confirmation request match. For example, if the identifier in the confirmation request is "8836," the user device may determine whether the user-input identifier is "8836." In some implementations, the user device may process the confirmation request and the user-input identifier to determine whether the user-input identifier and the identifier in the confirmation request match after receiving the user-input identifier, based on receiving the user-input identifier, and/or the like. In this way, the user device may confirm that the user intends to share credentials with the display device based on the user viewing the identifier on the display device and inputting the identifier as the user-input identifier.

In some implementations, the user device may determine that the user-input identifier and the identifier in the confirmation request match do not match. In some implementations, the user device, based on determining that the user-input identifier and the identifier in the confirmation request do not match, may prompt the user to input another identifier, receive user input of another identifier, and determine whether the other identifier matches the identifier in the confirmation request. Additionally, or alternatively, the user device may provide, to the display device, a message indicating that the user-input identifier does not match the identifier in the confirmation request. In some implementations, the display device, based on receiving a threshold number of messages indicating that the user-input identifier does not match the identifier in the confirmation request, may disconnect the connection with the user device. In this way, the display device, based on receiving the threshold number of messages indicating that the user-input identifier does not match the identifier in the confirmation request, may determine that the user does not intend to provide the wireless authentication service to the display device and disconnect the connection with the user device. By disconnecting the connection with the user device, the display device may then attempt to discover another wireless authentication service advertised by another device.

In some implementations, the display device, based on receiving a threshold number of messages indicating that the user-input identifier does not match the identifier in the confirmation request and disconnecting the connection with the user device, may display a new identifier and may provide a new confirmation request including the new identifier. For example, the user device may prompt the user to enter the new identifier, may receive another user-input identifier, may determine whether the other user-input identifier and the new identifier in the new confirmation request match and perform one or more of the iterative processes described above.

In some implementations, the user device may prompt the user to enter the identifier and, based on the user failing to provide a user-input identifier within a threshold amount time, may disconnect the connection with the display device. Additionally, or alternatively, the display device may provide, to the user device, the confirmation request and, based on the user device failing to provide a response to the confirmation request (e.g., encrypted credentials and/or the like) within a threshold amount time, may disconnect the connection with the user device.

In some implementations, the user device may repeat the steps of prompting the user to input another identifier, receiving user input of another identifier, and determining whether the other identifier matches the identifier in the confirmation request until the other identifier matches the identifier in the confirmation request or a threshold number of other identifiers do not match the identifier in the confirmation request. For example, if a threshold number (e.g., two, three, five, and/or the like) of other identifiers do not match the identifier in the confirmation request, the user device may disconnect the connection to the display device. In this way, the user device, based on receiving user input of the threshold number of other identifiers that do not match the identifier in the confirmation request, may determine that the user does not intend to provide the wireless authentication service to the display device and disconnect the connection with the display device. By disconnecting the connection with the display device, the user device may then advertise wireless authentication service to another device.

In some implementations, the user device, when disconnecting the connection, may provide, to the display device, a disconnection request. For example, the user device may provide the disconnection request and stop advertising the authentication service after a time period (e.g., 500 milliseconds, 600 milliseconds, and/or the like). In some implementations, the display device, based on the disconnection request, may disconnect the connection. In this way, the user device may ensure that the display device disconnects before the user device disconnects, which may prevent other devices connected to the display device via the short-range wireless communication protocol from disconnecting from the display device.

In some implementations, the user device may determine that the user-input identifier and the identifier in the confirmation request match, and may provide, to the display device, encrypted credentials, as shown in FIG. 1D, and by reference number 160. For example, the user device may provide, to the display device and based on determining that the user-input identifier and the identifier in the confirmation request match, the encrypted credentials. In some implementations, the user device may provide the encrypted credentials to the display device by writing to the predefined characteristic identifier on the predefined service identifier using BLE.

In some implementations, the user device may obtain credentials to authenticate the user to access the content delivery service from a memory of the user device. In some implementations, the user device may encrypt the credentials using a key stored on the user device, a key obtained from a secure cloud-based service, and/or the like. For example, the user device may encrypt the credentials using 256-bit Advanced Encryption Standard (AES-256) encryption. In some implementations, the credentials may include a token (e.g., an Open Authorization (OAuth) token and/or the like).

Figure 1E:
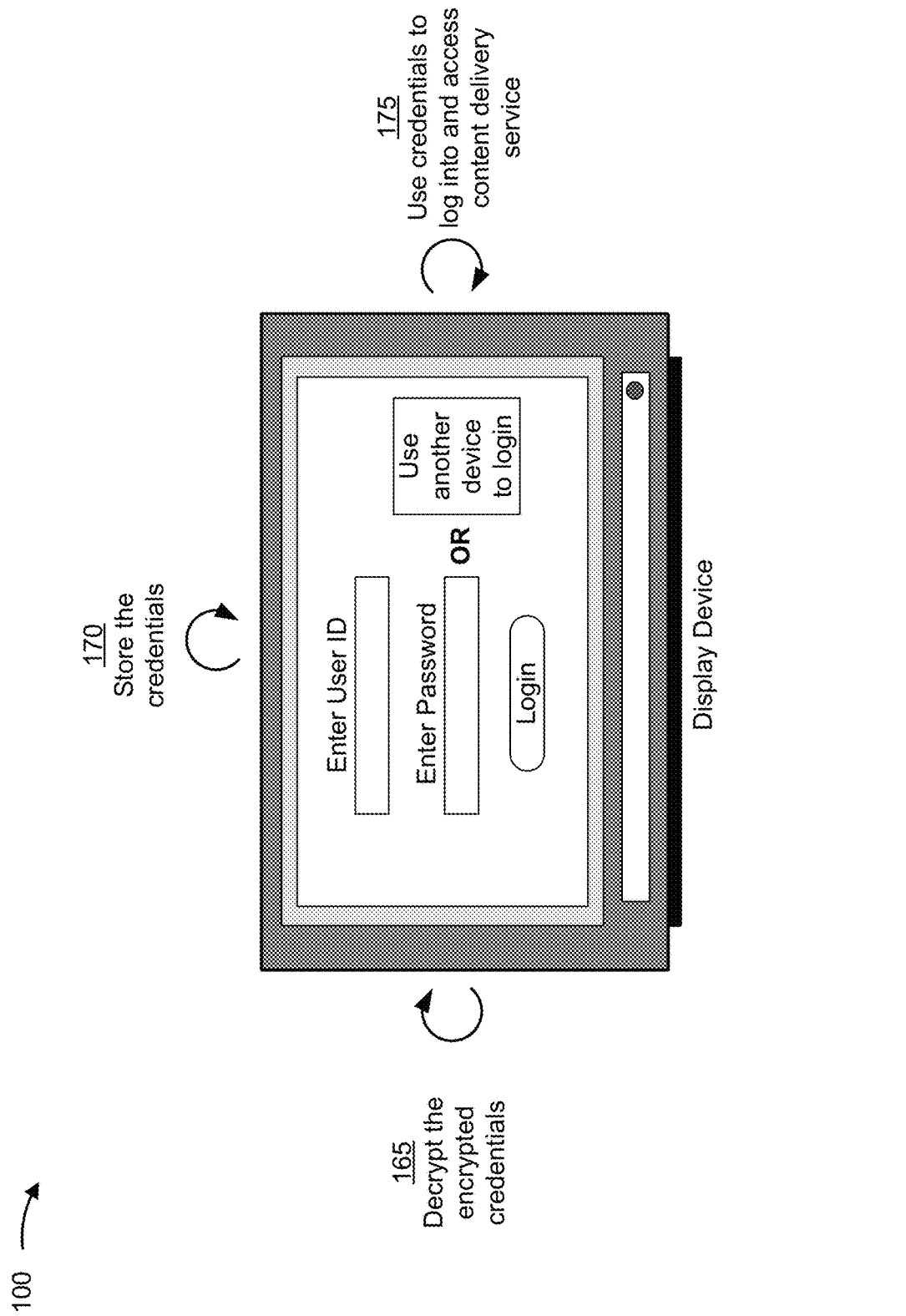

As shown in FIG. 1E, and by reference number 165, the display device may decrypt the encrypted credentials. For example, the display device may decrypt the encrypted credentials to obtain the credentials using a key stored on the display device, a key obtained from a secure cloud-based service, and/or the like. In some implementations, the user device may encrypt the credentials using a key stored on the user device and the display device may decrypt the encrypted credentials using a key stored on the display device, where the key stored on the user device and the key stored on the display device match. For example, the key stored on the user device and the key stored on the display device may be stored in secure folders of applications running on the user device and on the display device, where the content delivery service created the applications.

As shown in FIG. 1E, and by reference number 170, the display device may store the credentials. For example, the display device may store the credentials in the memory of the display device after decrypting the encrypted credentials (e.g., automatically store the credentials in the memory of the display device based on decrypting the encrypted credentials). Additionally, or alternatively, the display device may store the credentials in the secure folder of the application created by the content delivery service. In this way, the display device may conserve computing resources (e.g., processing resources, memory resources, power resources, communication resources, and/or the like) and/or network resources that would otherwise be used to prompt the user for the credentials the next time the user attempts to access the content delivery service, share the credentials again via the short-range wireless connection, share credentials over the Internet and/or via a secure cloud-based credential-sharing system, and/or the like.

As shown in FIG. 1E, and by reference number 175, the display device may use the credentials to log into and access the content delivery service. For example, the display device may use the credentials to authenticate the user for access to the content delivery service. In some implementations, the display device may provide the credentials to one or more server devices controlling access to the content delivery service to authenticate the user.

In this way, the user device may share credentials with the display device to authenticate the user for access to the content delivery service using a short-range wireless connection and conserving computing resources (e.g., processing resources, memory resources, power resources, communication resources, and/or the like) and/or network resources that would otherwise be used to process requests to reset credentials and access computer systems for handling the credential reset procedure. Additionally, or alternatively, sharing credentials using a short-range wireless communication protocol conserves computing resources (e.g., processing resources, memory resources, power resources, communication resources, and/or the like) and/or network resources that would otherwise be used to share credentials over the Internet and/or via a secure cloud-based credential-sharing system. In some implementations, using a short-range wireless communication protocol to share encrypted credentials may reduce the likelihood that the credentials will be impermissibly intercepted and may prevent network traffic from slowing the sharing process.

As indicated above, FIGS. 1A-1E are provided as examples. Other examples can differ from what is described with regard to FIGS. 1A-1E. The number and arrangement of devices shown in FIGS. 1A-1E are provided as one or more examples. In practice, there may be additional devices and/or networks, fewer devices and/or networks, different devices and/or networks, or differently arranged devices and/or networks than those shown in FIGS. 1A-1E.

For example, the display device may be another user device that does not have credentials to authenticate the user for access to one or more services. By way of another example, the user device may advertise a plurality of authentication services to a plurality of devices. In some implementations, the user device may establish connections with the plurality of devices. Additionally, or alternatively, each of the plurality of devices may display a unique identifier (e.g., a randomly-generated string of characters, a four-digit identification number, a randomly-selected word, and/or the like). In some implementations, the user device may receive user input (e.g., the unique identifier, one or more selections from a displayed list of the plurality of devices, and/or the like) identifying one or more devices of the plurality of devices to provide with credentials to authenticate the user for access to the one or more services. In some implementations, the user device may provide, to the one or more devices, one or more encrypted credentials to authenticate the user for access to the one or more services.

Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation(s) 100 may perform one or more functions described as being performed by another set of devices of example implementation(s) 100. For example, any or every operation described herein as being performed by the display device may be performed by the user device, and vice versa.

Figure 2:
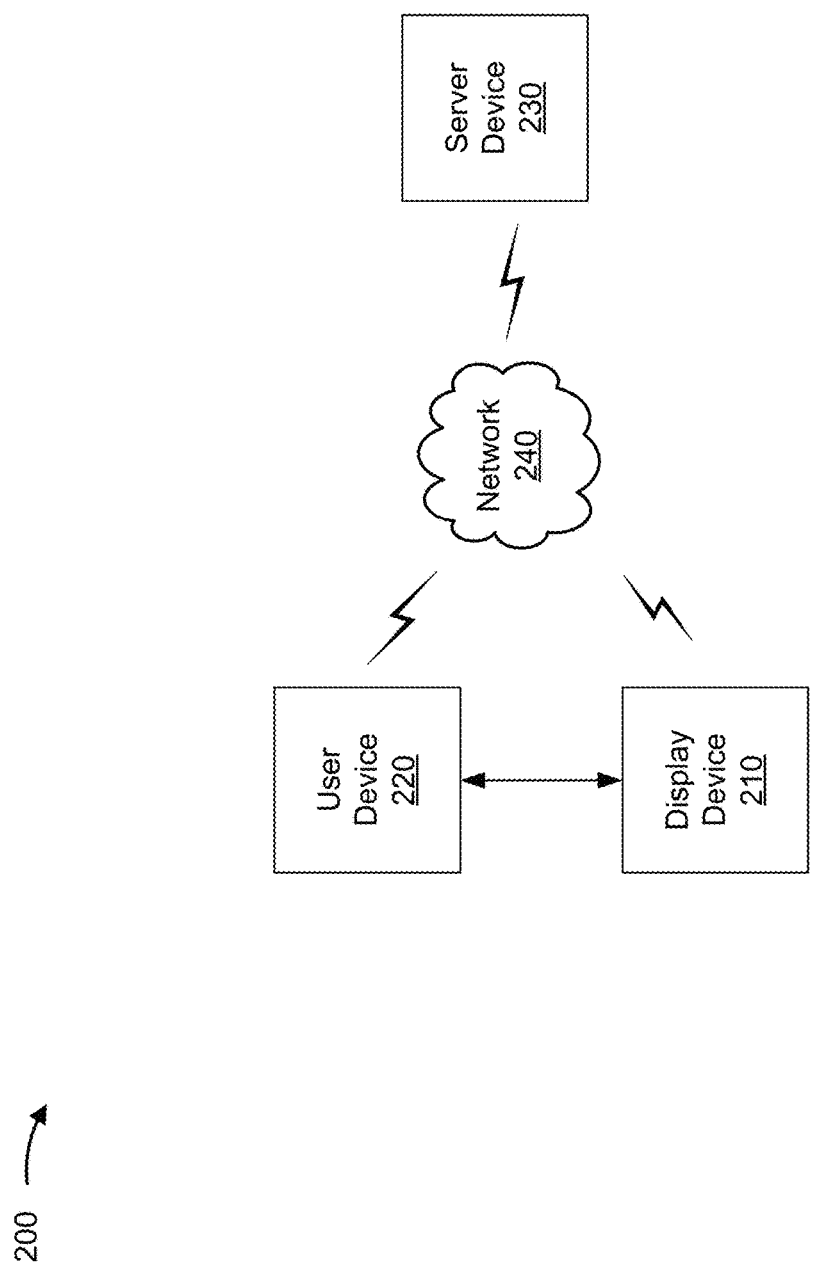
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a display device 210, a user device 220, a server device 230, and a network 240. Devices of environment 200 may interconnect via wired connections, wireless connections, or a combination of wired and wireless connections.

Display device 210 includes any digital or analog display that is capable of presenting audio and/or video content. Display device 210 may include technologies, such as cathode ray tube (CRT) displays, liquid crystal displays (LCDs), light-emitting diode (LED) displays, plasma displays, etc. Examples of display device 210 may include a television, a projector, a computer monitor, a user device (e.g., another user device similar to user device 220), and/or other types of devices capable of presenting audio and/or video content.

User device 220 includes one or more devices capable of receiving, generating, storing, processing, and/or providing information associated with credentials to authenticate a user to access a content delivery service. For example, user device 220 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Server device 230 includes one or more devices capable of receiving, generating, storing, processing, and/or providing information associated with credentials, controlling access to content delivery services, authenticating users, and/or the like. Examples of server device 230 may include a server device (e.g., connected to a data structure storing information) operated by a content delivery service provider, a network of computing devices and/or server devices (e.g., connected to a data structure storing information) operated by the content delivery service provider, and/or the like. In some implementations, server device 230 may include a communication interface that allows server device 230 to receive information from and/or transmit information to other devices in environment 200.

Network 240 includes one or more wired and/or wireless networks. For example, network 240 may include a fiber optic-based network, an intranet, the Internet, a cloud computing network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
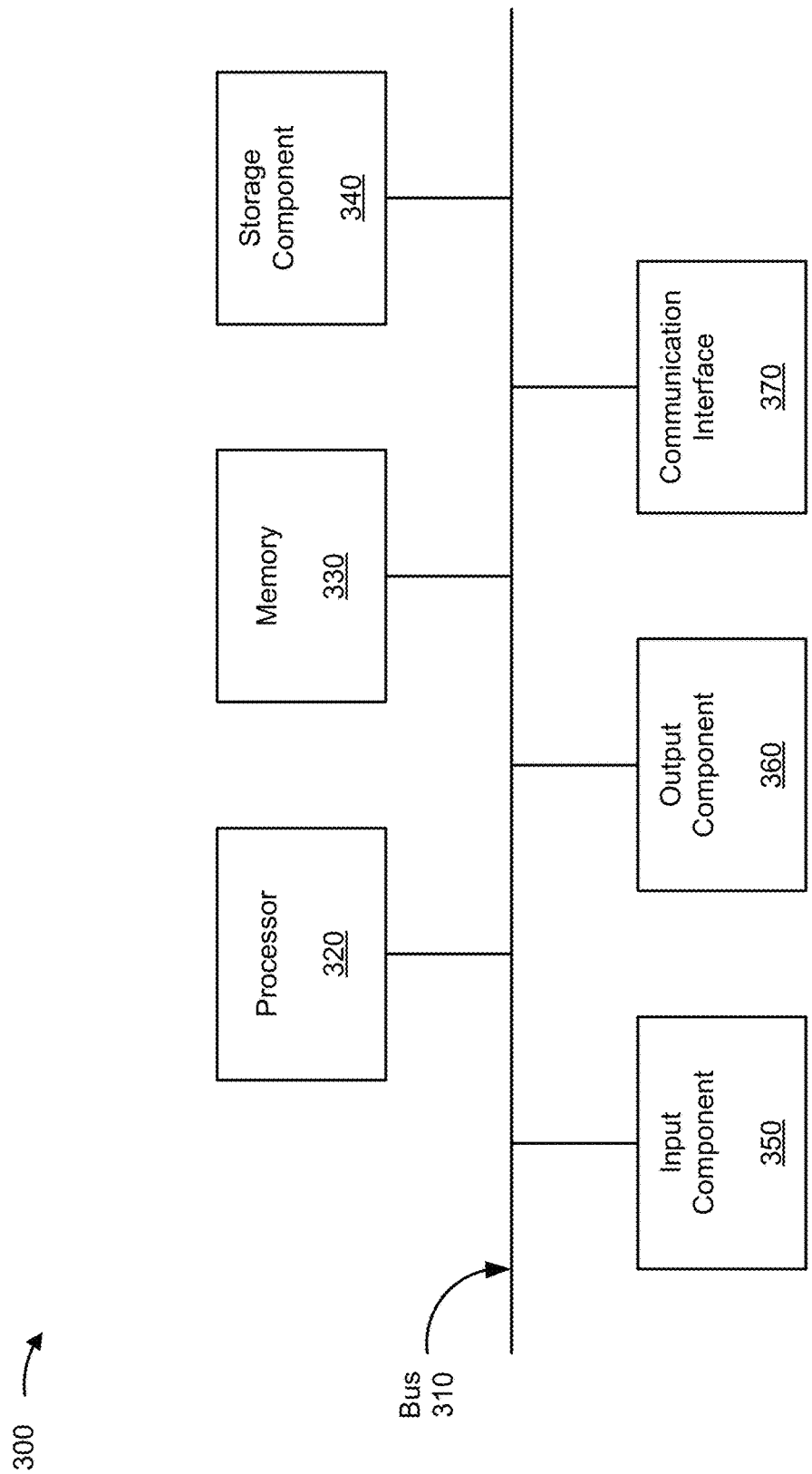
FIG. 3 is a diagram of example components of one or more devices of FIG. 2.

FIG. 3 is a diagram of example components of a device 300. Device 300 may correspond to display device 210 and/or user device 220. In some implementations, each of display device 210 and/or user device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
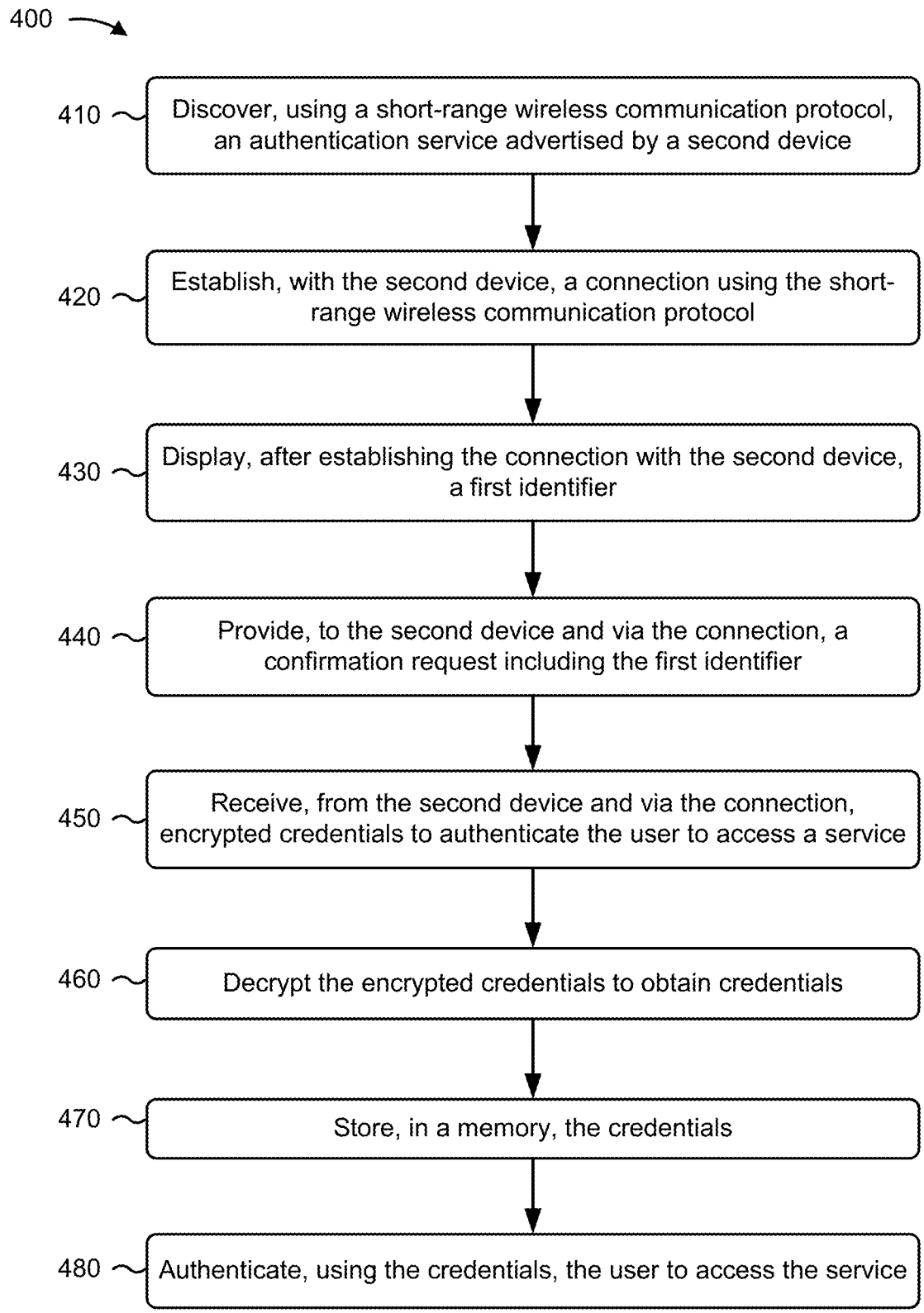
FIG. 4 is a flow chart of an example process for receiving credentials to authenticate a user to access a service.

FIG. 4 is a flow chart of an example process 400 for receiving credentials to authenticate a user to access a service. In some implementations, one or more process blocks of FIG. 4 may be performed by a first device (e.g., display device 210). In some implementations, one or more process blocks of FIG. 4 may be performed by another device or a group of devices separate from or including the first device, such as a second device (e.g., user device 220), and/or the like.

As shown in FIG. 4, process 400 may include discovering, using a short-range wireless communication protocol, an authentication service advertised by a second device (block 410). For example, the first device (e.g., using processor 320, memory 330, storage component 340, input component 350, output component 360, communication interface 370, and/or the like) may discover, using a short-range wireless communication protocol, an authentication service advertised by a second device, as described above. The short-range wireless communication protocol may include Wi-Fi, Bluetooth, Bluetooth Low Energy, and/or near-field communication, in some implementations. For example, process 400 may include discovering the authentication service via Bluetooth Low Energy communication on a predefined service identifier with a predefined characteristic identifier.

As further shown in FIG. 4, process 400 may include establishing, with the second device, a connection using the short-range wireless communication protocol (block 420). For example, the first device (e.g., using processor 320, memory 330, storage component 340, input component 350, output component 360, communication interface 370, and/or the like) may establish, with the second device, a connection using the short-range wireless communication protocol, as described above. Process 400 may include stopping discovering the authentication service after establishing the connection, based on establishing the connection, once the connection is established, and/or the like. In some implementations, the second device may receive user input authorizing sharing of credentials and may provide, to the first device and based on the user input authorizing sharing of credentials, a request for a first identifier. In some implementations, the second device may display an authentication screen including information identifying the second device and/or the authentication service.

As further shown in FIG. 4, process 400 may include displaying, after establishing the connection with the second device, a first identifier (block 430). For example, the first device (e.g., using processor 320, memory 330, storage component 340, input component 350, output component 360, communication interface 370, and/or the like) may display, after establishing the connection with the second device, a first identifier, as described above. In some implementations, the first identifier may include a randomly-generated string of characters.

As further shown in FIG. 4, process 400 may include providing to the second device, and via the connection, a confirmation request including the first identifier (block 440). For example, the first device (e.g., using processor 320, memory 330, storage component 340, input component 350, output component 360, communication interface 370, and/or the like) may provide to the second device, and via the connection, a confirmation request including the first identifier, as described above.

In some implementations, process 400 may include providing to the second device, and via the connection, a confirmation request including the first identifier to permit the second device to determine whether a second identifier, input by a user into the second device, matches the first identifier. For example, the second device may receive, form the first device and via the connection, the confirmation request including the first identifier, may receive user input of the second identifier, and determine whether the second identifier matches the first identifier. Additionally, or alternatively, the second device may provide, to the first device, via the connection, and based on determining whether the second identifier matches the first identifier, encrypted credentials to authenticate a user for access to a service.

As further shown in FIG. 4, process 400 may include receiving, from the second device, and via the connection, encrypted credentials to authenticate the user to access a service (block 450). For example, the first device (e.g., using processor 320, memory 330, storage component 340, input component 350, output component 360, communication interface 370, and/or the like) may receive, from the second device, and via the connection, encrypted credentials to authenticate the user to access a service, as described above. In some implementations, process 400 may include receiving, from the second device, and via the connection, encrypted credentials to authenticate the user to access a service based on the second device determining whether the second identifier matches the first identifier. In some implementations, the encrypted credentials may include a token.

As further shown in FIG. 4, process 400 may include decrypting the encrypted credentials to obtain credentials (block 460). For example, the first device (e.g., using processor 320, memory 330, storage component 340, input component 350, output component 360, communication interface 370, and/or the like) may decrypt the encrypted credentials to obtain credentials, as described above. In some implementations, process 400 may include decrypting the encrypted credentials using a key stored on the first device, a key obtained by the first device from a secure cloud-based service, and/or the like.

As further shown in FIG. 4, process 400 may include storing, in a memory, the credentials (block 470). For example, the first device (e.g., using processor 320, memory 330, storage component 340, input component 350, output component 360, communication interface 370, and/or the like) may store, in a memory, the credentials, as described above. In some implementations, process 400 may include storing the credentials in a memory of the first device.

As further shown in FIG. 4, process 400 may include authenticating, using the credentials, the user to access the service (block 480). For example, the first device (e.g., using processor 320, memory 330, storage component 340, input component 350, output component 360, communication interface 370, and/or the like) may authenticate, using the credentials, the user to access the service, as described above.

Process 400 may include additional implementations, such as any single implementation or any combination of implementations described above, below, and/or in connection with one or more other processes described elsewhere herein.

In some implementations, process 400 may include receiving, from the second device and via the connection, one or more messages indicating that the second identifier does not match the first identifier and disconnecting the connection based on receiving a threshold number of messages indicating that the second identifier does not match the first identifier.

In some implementations, the second device may advertise a plurality of authentication services to a plurality of devices and establish connections with the plurality of devices. In some implementations, the second device may receive user input identifying one or more devices of the plurality of devices to provide with credentials to authenticate the user for access to one or more services and provide, to the one or more devices, one or more encrypted credentials to authenticate the user for access to the one or more services.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   discovering, by a first device and using a short-range wireless communication protocol, an authentication service advertised by a second device;
   establishing, by the first device and with the second device, a connection using the short-range wireless communication protocol;
   providing, by the first device, for display on the first device, and after establishing the connection with the second device, a first identifier;
   providing, by the first device, to the second device, and via the connection, a confirmation request including the first identifier to permit the second device to determine whether a second identifier, input by a user into the second device, matches the first identifier;
   receiving, by the first device, from the second device, and via the connection, encrypted credentials to authenticate the user to access a content delivery service based on the second device determining whether the second identifier matches the first identifier;
   decrypting, by the first device, the encrypted credentials to obtain credentials;
   storing, by the first device and in a memory of the first device, the credentials; and
   authenticating, by the first device and using the credentials, the user to access the content delivery service.

2. The method of claim 1, wherein the short-range wireless communication protocol includes Wi-Fi, Bluetooth, Bluetooth Low Energy, and/or near-field communication.

3. The method of claim 1, wherein the first identifier is a randomly-generated string of characters.

4. The method of claim 1, wherein decrypting the encrypted credentials to obtain the credentials comprises decrypting the encrypted credentials using a key stored on the first device.

5. The method of claim 1, wherein decrypting the encrypted credentials to obtain the credentials comprises decrypting the encrypted credentials using a key obtained by the first device from a secure cloud-based service.

6. The method of claim 1, further comprising:
receiving, from the second device and via the connection, one or more messages indicating that the second identifier does not match the first identifier; and
disconnecting the connection based on receiving a threshold number of messages indicating that the second identifier does not match the first identifier.

7. A user device, comprising:
one or more memories; and
one or more processors, communicatively coupled to the one or more memories, configured to:
advertise an authentication service using a short-range wireless communication protocol;
establish, with a second device that has discovered the authentication service, a connection using the short-range wireless communication protocol;
receive, from the second device and via the connection, a confirmation request including a first identifier;
receive user input of a second identifier;
determine whether the second identifier matches the first identifier; and
provide, to the second device, via the connection, and based on determining whether the second identifier matches the first identifier, encrypted credentials to authenticate a user for access to a content delivery service.

8. The user device of claim 7, wherein the one or more processors are further configured to:
receive user input authorizing sharing of credentials; and
provide, to the second device and based on the user input authorizing sharing of credentials, a request for the first identifier.

9. The user device of claim 7, wherein the one or more processors are further configured to:
display an authentication screen including information identifying the second device and/or the authentication service.

10. The user device of claim 7, wherein the one or more processors are further configured to:
advertise a plurality of authentication services to a plurality of devices;
establish connections with the plurality of devices;
receive user input identifying one or more devices of the plurality of devices to provide with credentials to authenticate the user for access to one or more content delivery services; and
provide, to the one or more devices, one or more encrypted credentials to authenticate the user for access to the one or more content delivery services.

11. The user device of claim 7, wherein the one or more processors are further configured to:
stop advertising, after establishing the connection, the authentication service.

12. The user device of claim 7, wherein the one or more processors are further configured to:
repeatedly, based on determining that the second identifier does not match the first identifier, and until another identifier matches the first identifier or a threshold number of other identifiers do not match the first identifier:
prompt the user to input the other identifier;
receive user input of the other identifier; and
determine whether the other identifier matches the first identifier; and
disconnect the connection based on determining the threshold number of other identifiers do not match the first identifier.

13. The user device of claim 7, wherein the encrypted credentials include a token.

14. The user device of claim 7, further comprising:
encrypting, using a key stored on the user device, credentials to generate the encrypted credentials.

15. A non-transitory computer-readable medium storing instructions, the instructions comprising:
one or more instructions that, when executed by one or more processors, cause the one or more processors to:
discover an authentication service advertised by a second device;
establish, with the second device, a short-range wireless connection;
display a first identifier;
provide, to the second device and via the short-range wireless connection, a confirmation request including the first identifier to permit the second device to determine whether a second identifier, input by a user, matches the first identifier;
receive, from the second device and via the short-range wireless connection, encrypted credentials to authenticate the user for access to a content delivery service based on the second device determining whether the second identifier matches the first identifier;
decrypt the encrypted credentials to obtain credentials; and
authenticate, using the credentials, the user for access to the content delivery service.

16. The non-transitory computer-readable medium of claim 15, wherein the one or more instructions, that cause the one or more processors to discover the authentication service, cause the one or more processors to discover the authentication service via Bluetooth Low Energy communication on a predefined service identifier with a predefined characteristic identifier.

17. The non-transitory computer-readable medium of claim 15, wherein the one or more instructions, that cause the one or more processors to decrypt the encrypted credentials to obtain the credentials, cause the one or more processors to decrypt the encrypted credentials using a stored key.

18. The non-transitory computer-readable medium of claim 15, wherein the one or more instructions, that cause the one or more processors to decrypt the encrypted credentials to obtain the credentials, cause the one or more processors to decrypt the encrypted credentials using a key obtained from a secure cloud-based service.

19. The non-transitory computer-readable medium of claim 15, wherein the one or more instructions, when executed by the one or more processors, further cause the one or more processors to:
stop discovering, after establishing the short-range wireless connection, the authentication service.

20. The non-transitory computer-readable medium of claim 15, wherein the one or more instructions, when executed by the one or more processors, further cause the one or more processors to:

receive, from the second device and via the short-range wireless connection, one or more messages indicating that the second identifier does not match the first identifier; and disconnect the short-range wireless connection based on receiving a threshold number of messages indicating that the second identifier does not match the first identifier.

\* \* \* \* \*